United States Patent

[11] 3,611,102

| [72] | Inventor | Albert C. Leenhouts<br>Harwinton, Conn. |
|---|---|---|
| [21] | Appl. No. | 51,578 |
| [22] | Filed | July 1, 1970 |
| [45] | Patented | Oct. 5, 1971 |
| [73] | Assignee | The Superior Electric Company<br>Bristol, Conn. |

[54] PLURAL COMMAND SOURCES FOR CONTROL OF A STEPPING MOTOR
8 Claims, 5 Drawing Figs.

[52] U.S. Cl. .................................................. 318/696, 318/53
[51] Int. Cl. ...................................................... G05b 19/40
[50] Field of Search ............................................ 313/133, 254, 696, 685, 51, 53, 564, 440

[56] References Cited
UNITED STATES PATENTS
3,112,433  11/1963  Fairbanks......................  313/138

Primary Examiner—G. R. Simmons
Attorney—Johnson & Kline

ABSTRACT: A system for controlling incremental movement of a stepping motor from at least two command sources with each command source being capable of simultaneously or individually controlling the motor and with the motor moving the algebraic sum of the movement commanded by both sources by having each command source produced the same repeatable series of changes of energizations required to progressively increment the motor and using a logic circuit for combining the changes into an identical series of changes of energizations that are applied to the motor.

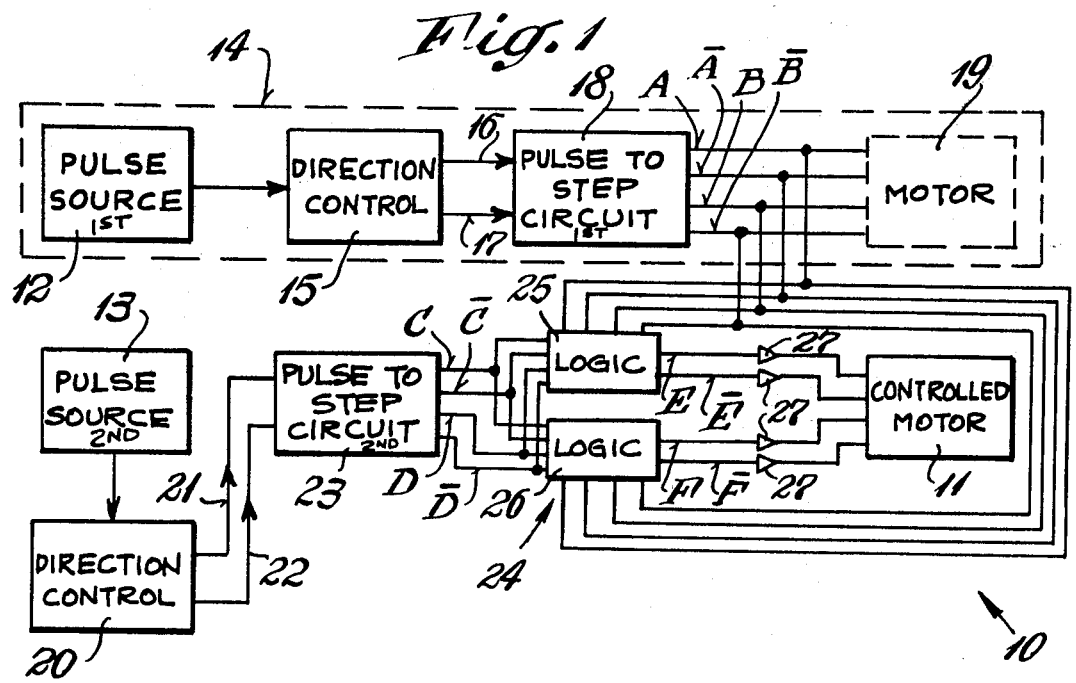
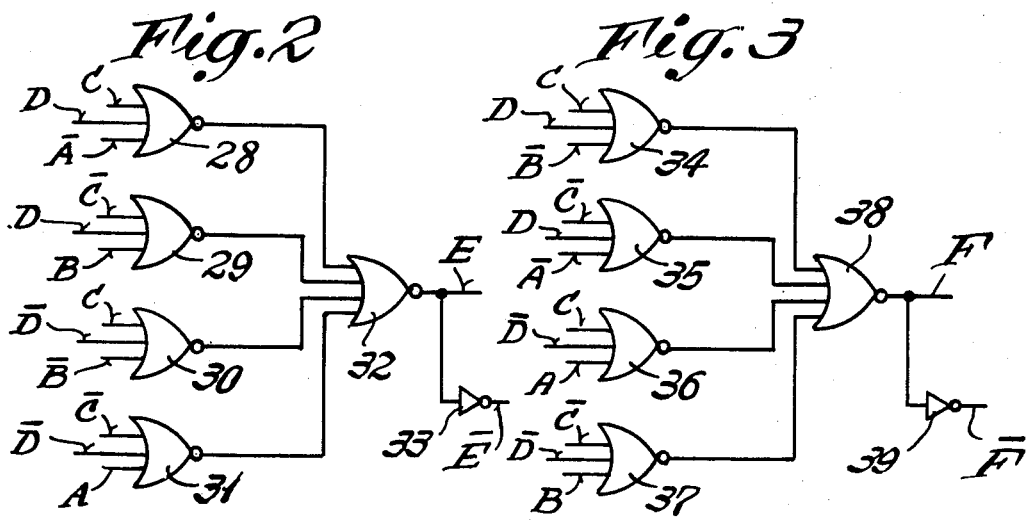
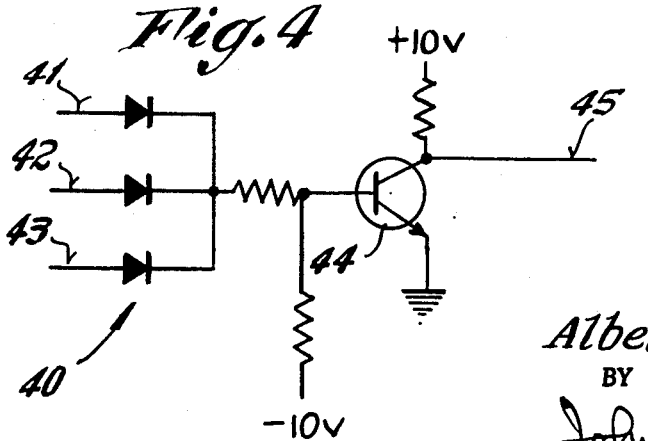

PLURAL COMMAND SOURCES FOR CONTROL OF A STEPPING MOTOR

In U.S. Pat. No. 3,280,395, assigned to the assignee of the present invention, there is disclosed a pulse to step control circuit that is connected to a stepping motor and causes each electrical pulse to be translated into a change of energization of the windings of the motor with the motor providing a step for each change. The circuit essentially instantaneously translates each pulse to a change of energization and in the absence of a pulse the circuit maintains its last energization constant to hold the motor stationary. Moreover, the motor is reversible and the control circuit has two channels with pulses on one channel causing the motor to step in one direction while pulses on the other channel effect a stepping in the opposite direction. The pulses to a control circuit may be derived from any command source such as a manually controlled oscillator, punched tape reading system, memory circuit, etc., with the number of pulses provided being the number of steps which the motor is required to make in order to move a desired distance.

It has been found desirable to provide control over a motor from both a first common source and also a second command source. The motor is thus desired to be stepped almost instantaneously with each pulse supplied from one or the other of the command sources and to have its total increments of movement be the algebraic sum of the number of pulses. An application of such a system could involve two numerically operated machine tools each of which has a motor with both motors being operated simultaneously from a single command source but yet in which there is an additional command source which provides pulses for operating the motor of one machine tool without operating the other. Accordingly, the one machine tool is thus capable of being operated by the first command source when the two machines are desired to be operating simultaneously but yet may be alternatively moved by the second command source independently of the first machine tool.

It is accordingly an object of the present invention to provide a system for effecting control over the movement of a stepping motor with the control being supplied from at least two different command sources.

Another object of the present invention is to achieve the above object with a system that is extremely reliable in use to cause a step to be produced for each pulse and with the total number of steps being the algebraic sum of the number of pulses.

A further object of the present invention is to provide a system in which the control over a stepping motor may be derived from at least two sources with the sources being capable of either simultaneously or independently controlling the movement of the motor.

The control circuit, as disclosed in the above-noted U.S. Patent, produces a change of energization to a stepping motor for each received pulse and with each change causing the motor to produce a step. When a plurality of pulses are supplied, the changes of energization follow a repeatable, sequential series with each series having the same plurality of changes. Each pulse to the control circuit will thus cause the next change to occur and for a train of pulses there will be a repeating of the series of changes until each pulse has produced a change. Specifically, the motor has stator windings terminating in four leads denoted A, $\bar{A}$, B and $\bar{B}$ and the changes, for movement in one direction, energize only two windings at a time in the following series AB $A\bar{B}$, $\bar{A}\bar{B}$, $\bar{A}B$, AB, etc., with the series thus being a four step repeatable series. Further, for movement in the reverse direction there is also the same four step series only the order of the steps in the series are reversed, namely, AB, $\bar{A}B$, $\bar{A}\bar{B}$, $A\bar{B}$, AB, etc.

In accordance with the present invention, the system includes at least two command sources, each having a pulse source with a pulse from either source causing the motor to change its energization. While it may be possible to utilize an anticoincidence circuit to the pulses, the present invention, however, has each command source direct its own pulse to its own pulse to step circuit. Thus the output of each command source is a series of changes of energization according to the above-noted repeatable series. The series of changes from both command sources are then applied to a logic circuit which produces an output having the same repeatable series with this output being the changes of energizations that are applied to the motor. The logic circuit consists merely of NOR gates and are accordingly extremely reliable thereby rendering the system substantially immune to error which may be caused by extraneous factors such as noise. The utilization of the series changes of energization enables each command source not only to be effective to control the one motor but also permits each command source to command its own motor irrespective of the other command sources. Moreover, by utilizing the changes of energization, two motors may be operated simultaneously with assurance that each will receive the same number of changes of energization and thus produce the same number of increments of movement.

Other features and advantages will hereinafter appear.

In the drawing:

FIG. 1 is a block diagram of the plural command sources for controlling a stepping motor according to the present invention.

FIG. 2 is a logic diagram of one portion of a logic circuit.

FIG. 3 is a logic diagram of another portion of the logic circuit.

FIG. 4 is a schematic diagram of a NOR gate used in the logic circuits.

Figure 5:
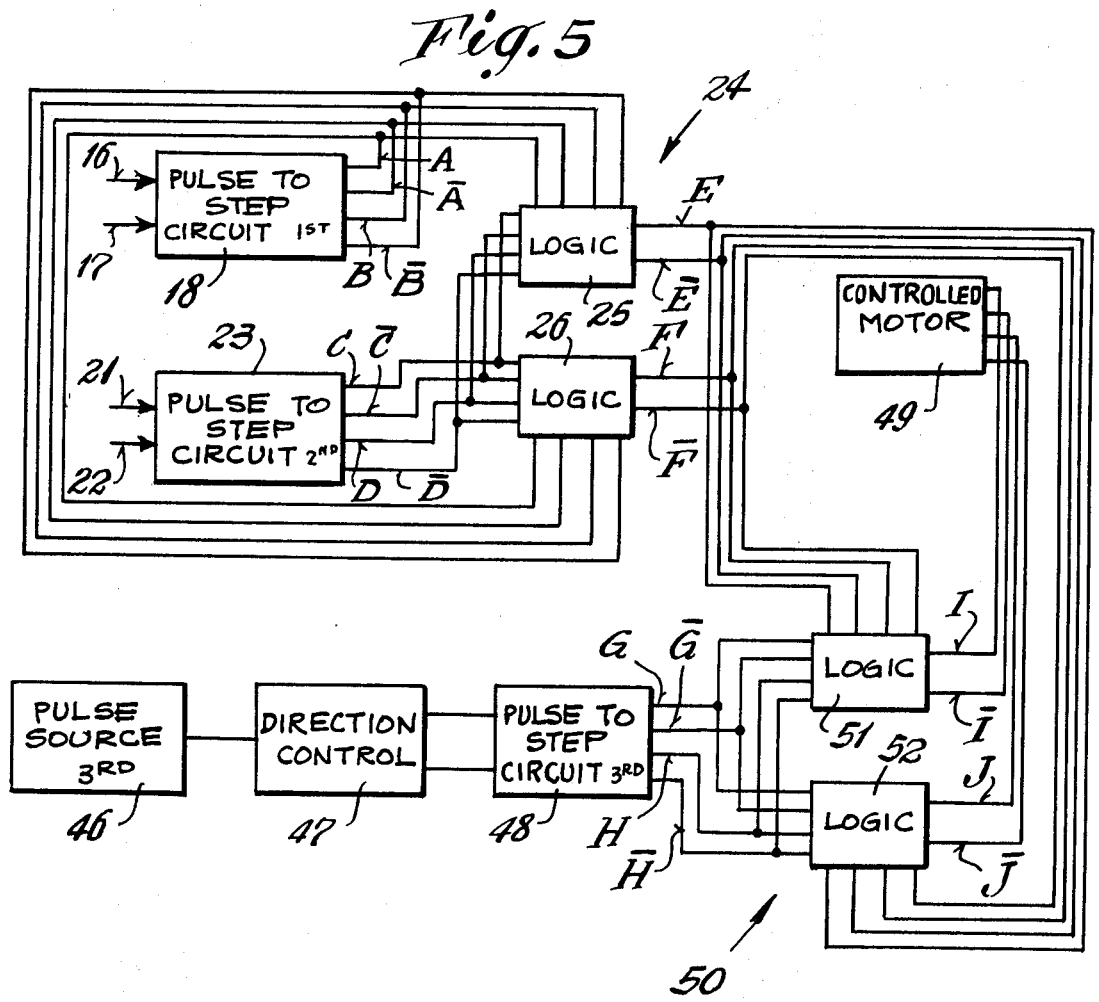
FIG. 5 is a view similar to FIG. 1 of a further embodiment of the present invention in which there are three pulses sources for controlling one motor.

Referring to the drawing, the system of the present invention is generally indicated by the reference numeral 10 and includes a controlled motor 11 which is caused to produce an incremental step for each pulse supplied from a first pulse source 12 or a second pulse source 13. The first pulse source 12 forms part of a first command source that is contained within a dotted line 14 and includes a direction control 15 for regulating the direction of movement of a motor by directing the pulses to either a forward channel 16 or a reverse channel 17. Both channels apply the pulses to a pulse to step circuit 18. The circuit 18 is disclosed in the above-noted patent and causes each pulse received on the channels 16 and 17 to be translated into energization of four output leads A, $\bar{A}$, B and $\bar{B}$ in accordance with the series above-noted. The leads a–$\bar{B}$ may, if desired, be connected to a motor 19 shown within dotted lines with the motor 19 producing an incremental movement for each pulse supplied from the pulse source 12.

The pulse source 13 forms part of a second command source which also includes a direction control 20 having a forward channel 21 and a reverse channel 22 that are connected to the input of another pulse to step circuit 23, the latter having four output leads C, $\bar{C}$, D and $\bar{D}$ with the energization of the output lead being changed for each pulse received on the channels 21 and 22 also in accordance with the above-noted series.

Both command sources are identical as to the pulse to step circuits and the direction controls and may be identical as to pulse sources with such items being commercially available from the hereof assignee. However, it is contemplated that one pulse source such as the source 12 may include a numerical system that supplies pulses in accordance with instructions on punched tape while the source 13 may be manually selecting pulse source in which the number of pulses desired may be selected and then provided.

The output leads A–$\bar{B}$ from the circuit 18 and the output leads C–$\bar{D}$ from the circuit 23 are applied as inputs to a logic circuit generally indicated by the reference numeral 24 and having a first part 25 and a second part 26. The logic circuit part 25 has a pair of output leads E and $\bar{E}$ while the logic circuit part 26 has a pair of output leads F and $\bar{F}$. The leads E–$\bar{F}$ are individually connected to amplifiers 27 to the controlled motor 11 and the changes of energization in accordance with the above-noted series to the controlled motor to cause the motor 11 to produce an increment of movement for each change of energization thereto. The series for one direction is energization of the leads EF, EF̄, ĒF̄, ĒF, EF, etc., and the reverse for movement in the other direction. The logic circuit 24 will provide one change for each change received from the circuits 18 and 23.

Referring to FIG. 2, the logic circuit 25 includes four NOR gates 28 through 31 with each NOR gate having three inputs and with the outputs of the four NOR gates constituting the inputs to a four input NOR gate 32 with the output of the latter gate being the lead E. The lead Ē is connected to the lead E through an inverter 33 so that only one lead is energized at a time. Similarly, as shown in FIG. 3, the logic circuit part 26 is identical having four, three input NOR gates 34 through 37, a four input NOR gate 38 with the output of the latter being the lead F and being connected through an inverter 39 to the lead F̄.

Each of the three input NOR gates 28–31 and 34–37 is identical and a schematic diagram of one gate is shown in FIG. 4 and identified by reference numeral 40. The gate includes three inputs 41, 42 and 43 together with a transistor 44 and an output lead 45. It will be understood that whenever any one of the leads A–D̄ is energized, there will be a +10 volt potential on the lead while if the lead is not energized it will have an essentially 0 potential. Accordingly, when any one of the three leads 41, 42 and 43 has a potential of +10 volts, the transistor 44 will be caused to be conducting producing a b 0 voltage on the lead 45. On the hand, when all three inputs have a 0 potential, indicating all are unenergized, the transistor 44 does not conduct and the output lead 45 is energized with +10 volts. It will also be understood that the two four input NOR gates 32 and 38 function in the same way in that if any input is energized, a 0 voltage will appear on the output while if all inputs are not energized then the output would be energized at +10 volts.

As pointed out above, the repeatable series for the circuit 18 has the leads energized as follows, AB, AB̄, ĀB̄, ĀB AB etc.; the circuit 23 has its leads energized in the series CD, CD̄, C̄D̄, C̄D, CD, etc.; while the leads of the logic circuit 24 must be energized in the following series EF, EF̄, ĒF̄, ĒF, FF etc. It will thus be understood that each set of leads has only two leads energized at a time, that only one of the leads changes its energization for each change, that the series of changes for all three leads are identical and hence each constitutes a repeatable series with each series including four steps.

In the operation of the system the leads A through D̄ are connected to the various NOR gates 28–31 and 34–37 as indicated in FIGS. 2 and 3. Assuming the condition where leads AB and CD are energized, the lead E will be energized by the logic circuit part 24 by each of the NOR gates 28–31 having at least one lead energized causing the inputs to the gate 32 to have all leads not energized which in turn energizes lead E. Similarly, the gates 34–37 will also have at least one lead energized which renders all leads to the gate 38 to be unenergized, causing the lead F to be energized. Assuming that it is desired to cause the controlled motor 11 to advance one increment by a command from the first command source in the forward direction, a pulse from the pulse source 12 is directed over channel 16 to cause the pulse to step circuit 18 to change its energization to have leads AB̄ energized. The leads C and D will be maintained energized. Each of the gates 28–31 will now have at least one energized input, producing all unenergized inputs to the gate 32 and causing the lead E to be maintained energized. The gates 34 through 36 will each have at least one energized lead while the gate 37 will have all unenergized leads producing to the NOR gate 38 three unenergized and one energized input which causes the gate to produce an unenergized lead F. However, the inverter 39 causes the lead F̄ to become energized. The control motor 11 will accordingly then be forwardly advanced one increment of movement.

Assuming that the next increment is desired to be in the same forward direction but is derived from the command source by a pulse from the pulse source 13 being directed over the forward channel 21 which changes the energization of the leads EF̄ to EF̄. The leads A and B̄ will be maintained energized. In this third step, the gate 29 will have all unenergized inputs causing the gate 32 to render the lead E not energized and the lead Ē energized while the gate 35 will have all energized leads causing the lead F to be energized. The motor will advance one increment.

It will thus be seen that as the pulse from each pulse source changes the combination of the two output leads that are energized of each circuit 18 and 23, that the logic circuit will also cause the leads E–F to also change their energization in accordance with the same repeatable series. Accordingly, the controlled motor 11 may be made to operate in synchronism with the motor 19 but yet on the other hand, the motor 11 may be incremented by pulses from the source 13 without causing movement of the motor 19. Additionally, the repeatable series to the motor 11 is reversed as either of the command sources produces a reverse pulse.

Shown in FIG. 5 is a further embodiment of the present invention in which there is the first command source having the pulse to step circuit 18 and a second command source having the pulse to step circuit 23 together with a third command source that includes a pulse source 46, a direction control 47 and a third pulse to step circuit 48. In this embodiment any one of the three command sources is capable of operating the controlled motor 49 in addition, if desired, to operating its own motor (not shown). Thus the circuit includes the logic circuit 24 having two parts 25 and 26, however, the output thereof on leads E–F are supplied to a second logic circuit 50 which is identical to the circuit 24 and thus has two parts 51 and 52. Also connected to the logic circuit 50 are the four leads G–H̄ from the third pulse to step circuit 48. The output of the logic circuit 50 appears in the leads I–J which are connected through amplifiers (not shown) to the motor 49. This circuit functions in the same manner that the previous circuit functions with the exception that one input to the logic circuit is the sum of the input from two command sources rather than just one. The output of the circuit 50 also has its leads energized in the same repeatable series with four steps in each series.

It will be understood that either command source may operate the motor and moreover if in the FIG. 1 embodiment changes of energization occur in the leads A–B̄ and C–B̄ simultaneously that the logic circuit will accept the both changes and produce a change first in the part 25 and then in the part 26 so that the circuit may accept pulses either from just one source or simultaneously from two sources. It is also noted that if one command source directs a forward incremental movement of the motor and the other command source directs reversal movement of the motor that the total movement of the motor 11 will be the algebraic sum of the number of changes of energization produced by each of the circuits 18 and 23.

It will accordingly be appreciated that there has been disclosed a system for accepting commands for causing incremental stepping of a controlled stepping motor with the commands being derivable from at least two command sources. One command source may operate not only the control motor but also another motor causing both to operate in synchronism while the control motor may also be caused to be incrementally advanced by commands from the second command source without affecting another motor. Moreover, the circuit is rendered extremely reliable by its utilization of the changes of energization for effecting the control motor and the changes are basically at a low frequency and definite potential thereby rendering the system substantially noise immune. In addition the circuit utilizes components that are readily available and economical to assembly to produce the system.

Variations and modifications may be made within the scope of the claims and portions of the improvements may be used without others.

I claim:

1. A system for providing incremental movement of a stepping motor with a first command source and a second command source providing control over the incremental movement comprising a stepping motor having means for providing an incremental movement for each change of energization applied to its windings with said changes being a sequentially repeatable series with each series having the same plurality of changes, a first command source for producing a train of pulses and including means for translating each pulse into a change of energization with the changes following the same repeatable series, a second command source for producing a train of pulses and including means for translating each pulse into a change of energization with the changes following the same repeatable series, means for accepting the changes of energization from the first command source and the second command source and providing changes of energization with the changes following the repeatable series and being equal in number to the sum of the changes from the first and second command sources and means for applying the changes from the accepting means to the stepping motor to enable said motor to provide an incremental movement under the control of the two command sources.

2. The invention as defined in claim 1 in which the motor provides a reverse movement with a reversal of the changes in the series, in which at least one command source produces a reversal of the changes in its series to command a reverse movement, and in which the accepting means provides a reversal of the changes in its series for each reverse change received whereby the total changes of energization to the motor is the algebraic sum of the number of changes to the accepting means from both command sources.

3. The invention as defined in claim 2 in which the translating means in one command source includes a forward channel and a reverse channel, in which said one command source includes direction control means for directing pulses to either one of the channels and in which pulses on one channel cause a reversal of the series of changes from pulses on the other channel.

4. The invention as defined in claim 1 in which there is a second stepping motor having means for providing an incremental movement for each change of energization applied to its windings with said changes being a sequentially repeatable series with each series having the same number of changes and in which the second motor is connected to receive the changes of energization from the translating means of one command source whereby said one command source controls simultaneously operation of both motors.

5. The invention as defined in claim 1 in which each translating means and the accepting means has an output having four leads on which the changes of energization appear, in which each change of energization has two of the four leads energized and in which a change of energization changes one of the two leads that is energized whereby a series of changes of energization has four different changes.

6. The invention as defined in claim 5 in which the accepting means includes a plurality of gates with each gate having a different combination of leads from the translating means connected as inputs thereto.

7. The invention as defined in claim 6 in which each gate has an output and in which there is at least another gate with the another gate having the outputs of some of the gates as its input and at least one of the leads as its output.

8. The invention as defined in claim 1 in which there is a third command source for providing control over the incremental movement of the motor, said source including means for producing pulses and means for translating each pulse into a change of energization with the changes following the same repeatable series; in which the accepting means includes means for combining the changes of energization caused by the first and second command sources with the changes of energization produced by the third command means to produce changes of energization following the repeatable series and constituting the changes from the accepting means whereby the controlled motor may be controlled from either one of the three command sources.